(12) United States Patent
Xu et al.

(10) Patent No.: US 9,479,970 B2
(45) Date of Patent: Oct. 25, 2016

(54) BEARER SWITCHING METHOD, HOME NODEB GATEWAY, AND HOME NODEB

(71) Applicant: HUAWEI TECHNOLOGIES CO., LTD., Shenzhen (CN)

(72) Inventors: Xiaoying Xu, Shanghai (CN); Dong Chen, Shanghai (CN)

(73) Assignee: HUAWEI TECHNOLOGIES CO, LTD., Shenzhen (CN)

( * ) Notice: Subject to any disclaimer, the term of this patent is extended or adjusted under 35 U.S.C. 154(b) by 88 days.

(21) Appl. No.: 14/263,279

(22) Filed: Apr. 28, 2014

(65) Prior Publication Data

US 2014/0233532 A1  Aug. 21, 2014

Related U.S. Application Data

(63) Continuation of application No. PCT/CN2012/083831, filed on Oct. 31, 2012.

(30) Foreign Application Priority Data

Oct. 31, 2011 (CN) .......................... 2011 1 0337665

(51) Int. Cl.
*H04W 36/00* (2009.01)
*H04W 36/04* (2009.01)
(Continued)

(52) U.S. Cl.
CPC ......... *H04W 36/0011* (2013.01); *H04W 8/087* (2013.01); *H04W 36/04* (2013.01); *H04W 84/045* (2013.01); *H04W 88/16* (2013.01)

(58) Field of Classification Search
CPC .................... H04W 36/0011; H04W 36/0016; H04W 36/04; H04W 36/08; H04W 84/045
See application file for complete search history.

(56) References Cited

U.S. PATENT DOCUMENTS

2011/0171915 A1\* 7/2011 Gomes .................. H04W 24/10
455/73
2011/0292905 A1  12/2011 Ni
(Continued)

FOREIGN PATENT DOCUMENTS

CN          101252472          8/2008
CN          101932074          12/2010
(Continued)

OTHER PUBLICATIONS

International Search Report issued on Jan. 31, 2013 in corresponding International Patent Application No. PCT/CN2012/083831.
(Continued)

*Primary Examiner* — Pao Sinkantarakorn
(74) *Attorney, Agent, or Firm* — Staas & Halsey LLP (57) ABSTRACT

Embodiments of the present invention include a bearer switching method, a home NodeB gateway, and a home NodeB. The method includes: receiving a first relocation request message sent by a source home NodeB HNB, where the first relocation request message is used to request switching of a local IP access LIPA bearer; and determining, according to the first relocation request message, whether a target HNB supports LIPA mobility, so as to perform a corresponding switching operation. According to the bearer switching method, switching of an LIPA bearer is effectively managed, thereby saving a resource and signaling, and avoiding resource waste and an invalid signaling overhead caused when an HNB that does not support the LIPA mobility prepares the resource for the LIPA bearer.

28 Claims, 8 Drawing Sheets (51) Int. Cl.
  *H04W 84/04* (2009.01)
  *H04W 8/08* (2009.01)
  *H04W 88/16* (2009.01)

(56) References Cited

U.S. PATENT DOCUMENTS

| 2012/0108240 | A1 | 5/2012 | Liu et al. |
| 2012/0166600 | A1 | 6/2012 | Wu et al. |
| 2013/0003698 | A1* | 1/2013 | Olvera-Hernandez H04W 8/082 370/331 |
| 2013/0188604 | A1* | 7/2013 | Chin .................. H04W 36/08 370/331 |
| 2014/0105145 | A1 | 4/2014 | Gao et al. |
| 2014/0113637 | A1 | 4/2014 | Guan et al. |

FOREIGN PATENT DOCUMENTS

| CN | 102014369 | 4/2011 |
| CN | 102076036 | 5/2011 |
| CN | 102209398 | 10/2011 |
| CN | 102238238 | 11/2011 |
| CN | 102300336 | 12/2011 |
| CN | 102369746 | 3/2012 |
| CN | 102369759 | 3/2012 |
| CN | 102487331 | 6/2012 |
| CN | 102498692 | 6/2012 |
| CN | 102754460 | 10/2012 |
| CN | 102843739 | 12/2012 |
| CN | 102869116 | 1/2013 |
| WO | WO 2010/091609 | 8/2010 |
| WO | WO 2011/026367 | 3/2011 |
| WO | WO 2011/109999 | 9/2011 |

OTHER PUBLICATIONS

"3$^{rd}$ Generation Partnership Project; Technical Specification Group Radio Access Network; UTRAN architecture for 3G Home Node B (HNB); Stage 2 (Release 9)", *3GPP TS 25.467 V 9.5.0 (Sep. 2011)Technical Specification*, 2011, pp. 1-34, 3$^{rd}$ Generation Organizational Partners.

International Search Report mailed Jan. 31, 2013 in corresponding International Patent Application No. PCT/CN2012/083831.

* cited by examiner

BEARER SWITCHING METHOD, HOME NODEB GATEWAY, AND HOME NODEB

CROSS-REFERENCE TO RELATED APPLICATIONS

This application is a continuation of International Application No. PCT/CN2012/083831, filed on Oct. 31, 2012, which claims priority to Chinese Patent Application No. 201110337665.8, filed on Oct. 31, 2011, both of which are hereby incorporated by reference in their entireties.

TECHNICAL FIELD

Embodiments of the present invention relate to the communications field, and in particular, to a bearer switching method, a home NodeB gateway, and a home NodeB in the communications field.

BACKGROUND

A home NodeB (Home NodeB, "HNB" for short) can be used to expand coverage of a mobile network and provide more targeted services. An HNB may not belong to a family or an enterprise, and can connect to a network of a mobile operator by using a broadband connection. A terminal that has permission to access an HNB may access, by using an HNB of a third-generation mobile communications technology (3rd-Generation, "3G" for short) or Long Term Evolution (Long Term Evolution, "LTE" for short) system, the network of the mobile operator to acquire a service.

A local network may be further deployed in an enterprise or at home by using an HNB, so that a user equipment (User Equipment, "UE" for short) that accesses the HNB is capable of accessing the local network deployed with the home NodeB, while user data does not need to pass a core network of the operator.

In a current HNB system architecture, a local gateway (local gateway, "LGW" for short) is integrated with an HNB, where the LGW and the HNB have a same address. The HNB that supports local IP (Internet Protocol) access (Local IP Access, "LIPA" for short) is capable of reporting, in an initial UE message, an IP address of the LGW to a serving GPRS support node (Serving GPRS Support Node, "SGSN" for short, where GPRS is short for the general packet radio service (General Packet Radio Service)), and provides a Gi/SGi interface that is used by the LIPA, so as to support associating, by using a related ID (identifier), an internal user plane channel between the LGW and the HNB.

Currently, when inter-HNB handover occurs on a UE, the LGW initiates deactivation of an LIPA bearer, that is, LIPA mobility is not supported. If the deactivation of the LIPA bearer is not initiated before the handover of the UE, a target HNB that does not support the LIPA mobility prepares resources for the LIPA bearer when the UE hands over to the target HNB, thereby causing resource waste.

Therefore, a solution is needed to effectively manage switching of the LIPA bearer, so as to avoid resource waste.

SUMMARY

Multiple aspects of the present invention provide a bearer switching method, a home NodeB gateway, and a home NodeB, which can effectively manage switching of an LIPA bearer, thereby avoiding resource waste.

One aspect of the present invention provides a bearer switching method. The method includes: receiving a first relocation request message sent by a source home NodeB HNB, where the first relocation request message is used to request switching of a local IP access LIPA bearer; and determining, according to the first relocation request message, whether a target HNB supports LIPA mobility, so as to perform a corresponding switching operation.

Another aspect of the present invention provides a bearer switching method. The method includes: sending a first relocation request message to a target home NodeB gateway HNB GW, where the first relocation request message is used to request switching of a local IP access LIPA bearer; and when the target HNB GW determines according to the first relocation request message that a target home NodeB HNB does not support LIPA mobility, receiving a switching failure message sent by the target HNB GW, where the switching failure message is used to indicate a failure to switch the LIPA bearer.

Still another aspect of the present invention provides a home NodeB gateway HNB GW. The home NodeB gateway includes: a first receiving module, configured to receive a first relocation request message sent by a source home NodeB HNB, where the first relocation request message is used to request switching of a local IP access LIPA bearer; and a determining module, configured to determine, according to the first relocation request message received by the first receiving module, whether a target HNB supports LIPA mobility, so as to perform a corresponding switching operation.

Still another aspect of the present invention provides a home NodeB HNB. The home NodeB includes: a first sending module, configured to send a first relocation request message to a target home NodeB gateway HNB GW, where the first relocation request message is used to request switching of a local IP access LIPA bearer; and a receiving module, configured to, when the target HNB GW determines according to the first relocation request message sent by the first sending module that a target home NodeB HNB does not support LIPA mobility, receive a switching failure message sent by the target HNB GW, where the switching failure message is used to indicate a failure to switch the LIPA bearer.

Based on the foregoing technical solutions, according to the bearer switching method, the home NodeB gateway, and the home NodeB in embodiments of the present invention, a target HNB GW determines whether a target HNB supports LIPA mobility, and performs a corresponding switching operation, so that switching of an LIPA bearer is effectively managed, thereby saving a resource and signaling, and avoiding resource waste and an invalid signaling overhead caused when an HNB that does not support the LIPA mobility prepares the resource for the LIPA bearer.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

It should be understood that the technical solutions in the present invention may be applied to various communications systems, such as a Global System for Mobile Communications (Global System for Mobile communications, "GSM" for short) system, a Code Division Multiple Access (Code Division Multiple Access, "CDMA" for short) system, a Wideband Code Division Multiple Access (Wideband Code Division Multiple Access, "WCDMA" for short) system, a General Packet Radio Service (General Packet Radio Service, "GPRS" for short) system, a Long Term Evolution (Long Term Evolution, "LTE" for short) system, an LTE Frequency Division Duplex (Frequency Division Duplex, "FDD" for short) system, an LTE Time Division Duplex (Time Division Duplex, "TDD" for short), a Universal Mobile Telecommunications System (Universal Mobile Telecommunications System, "UMTS" for short), and a Worldwide Interoperability for Microwave Access (Worldwide Interoperability for Microwave Access, "WiMAX" for short) communications system.

It should be further understood that in the embodiments of the present invention, a user equipment (User Equipment, "UE" for short) may be referred to as a terminal (terminal), a mobile station (Mobile Station, "MS" for short), a mobile terminal (Mobile Terminal), or the like. The user equipment may communicate with one or more core networks by using a radio access network (Radio Access Network, "RAN" for short). For example, the user equipment may be a mobile phone (or referred to as a "cellular" phone), a computer that has a mobile terminal, or the like. For example, the user equipment may further be a portable, pocket-sized, handheld, computer-embedded, or vehicle-mounted mobile apparatus, which exchanges voice and/or data with the radio access network.

In the embodiments of the present invention, a base station may be a base transceiver station (Base Transceiver Station, "BTS" for short) in GSM or CDMA, a NodeB (NodeB, "NB" for short) in WCDMA, or an evolved NodeB (evolved Node B, "ENB" or "eNodeB" for short) in LTE, and this is not limited in the present invention. It should be further understood that the present invention may be applied to a heterogeneous network, and a home NodeB HNB may correspond to a macro base station in a macro cell or a micro base station in a micro cell. However, for ease of description, a home NodeB HNB and a user equipment UE are used as an example for description in the following embodiments.

In addition, the terms "system" and "network" in this specification may be used interchangeably in this specification. The term "and/or" in the specification describes only an association relationship for describing associated objects and represents that three relationships may exist. For example, A and/or B may represent the following three cases: Only A exists, both A and B exist, and only B exists. In addition, the character "/" in the specification generally indicates an "or" relationship between the associated objects.

Figure 1A:
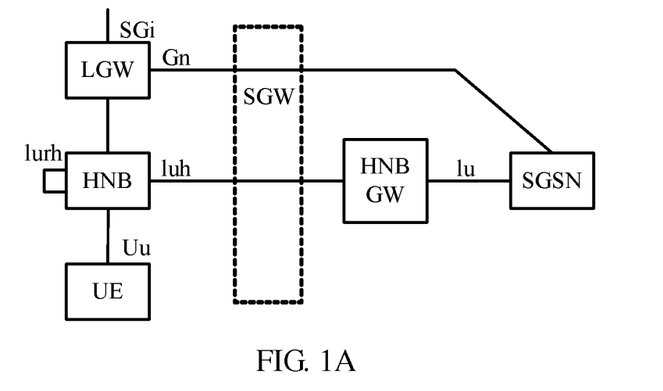
FIG. 1A and FIG. 1B are schematic architectural diagrams of HNB systems according to an embodiment of the present invention.
Figure 1B:
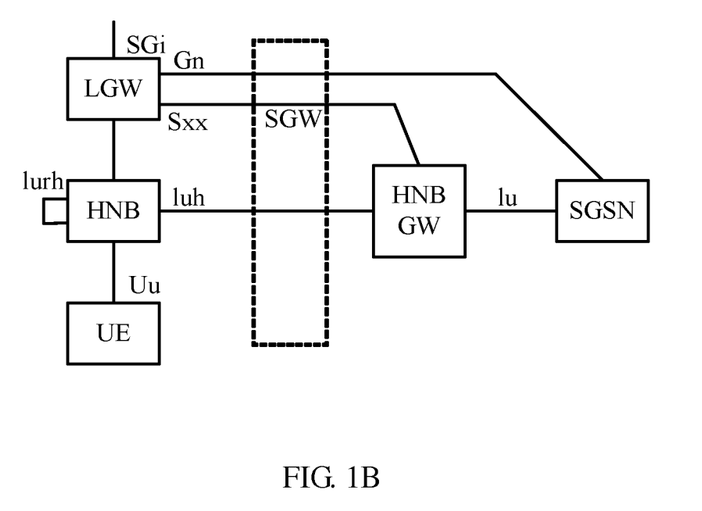

FIG. 1A and FIG. 1B show schematic architectural diagrams of HNB systems according to an embodiment of the present invention. As shown in FIG. 1A or FIG. 1B, the HNB system includes an HNB, a home NodeB gateway (Home NodeB GateWay, "HNB GW" for short), a serving GPRS support node (Serving GPRS Support Node, "SGSN" for short), a UE, an LGW, and a security gateway (Security GateWay, "SGW" for short).

In the HNB system shown in FIG. 1A, the LGW is indirectly connected to the HNB GW by using the HNB, the HNB is connected to the HNB GW through an Iuh interface, and a direct interface exists between the HNB and the LGW, where the interface supports the GPRS Tunneling Protocol (GPRS Tunneling Protocol, "GTP" for short), supports a user plane function, and optionally supports a control plane function. In the HNB system shown in FIG. 1B, there is only the user plane function between the LGW and the HNB, and the LGW is directly connected to the HNB GW through an Sxx interface, where the Sxx interface has the control plane function and supports the GTP protocol.

It should be understood that the HNB systems shown in FIG. 1A and FIG. 1B are merely exemplary, an HNB system may also have another architecture, and this is not limited in this embodiment of the present invention.

Figure 2:
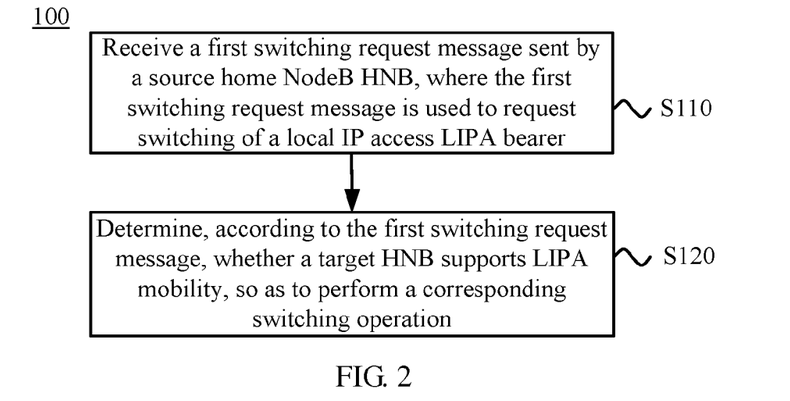
FIG. 2 is a schematic flowchart of a bearer switching method according to an embodiment of the present invention.

FIG. 2 shows a schematic flowchart of a bearer switching method 100 according to an embodiment of the present invention. The method 100 shown in FIG. 2 is executed by a home NodeB gateway HNB GW.

S110. Receive a first relocation request message sent by a source home NodeB HNB, where the first relocation request message is used to request switching of a local IP access LIPA bearer.

S120. Determine, according to the first relocation request message, whether a target HNB supports LIPA mobility, so as to perform a corresponding switching operation.

To effectively manage switching of an LIPA bearer, a target HNB GW may receive a first relocation request message sent by an HNB, where the first relocation request message is used to request the switching of an LIPA bearer; and the target HNB GW determines, according to the first relocation request message, whether the target HNB supports LIPA mobility, so as to perform a corresponding switching operation. It should be understood that the LIPA bearer generally refers to a bearer for receiving or sending a local service. For example, the LIPA bearer includes a bearer of a non-access stratum, a radio bearer, or the like, where the bearer of the non-access stratum may include Packet Data Protocol (Packet Data Protocol, "PDP" for short) content or the like.

Therefore, in the bearer switching method according to this embodiment of the present invention, a target HNB GW determines whether a target HNB supports LIPA mobility, and performs a corresponding switching operation, so that switching of an LIPA bearer is effectively managed, thereby saving a resource and signaling, and avoiding resource waste and an invalid signaling overhead caused when an HNB that does not support the LIPA mobility prepares the resource for the LIPA bearer.

It should be understood that, when a UE performs handover between HNBs and an HNB GW, the target HNB GW is also a source HNB GW.

In S110, the target HNB GW receives the first relocation request message sent by the HNB.

For example, the first relocation request message is used to request the switching of the LIPA bearer, and the first relocation request message may be a relocation request (Relocation Request) of an enhanced Radio Network Subsystem Application Part (Radio Network Subsystem Application Part, "RNSAP" for short).

In this embodiment of the present invention, optionally, the first relocation request message includes at least one of an identifier of a local network on which a local gateway LGW connecting to the source HNB resides, an identifier of the LGW, an address of the LGW, and request information used for requesting the switching of the LIPA bearer.

Optionally, the first relocation request message includes at least one of the identifier of the local network on which the LGW connecting to the source HNB resides, the identifier of the LGW, and the address of the LGW, so as to implicitly indicate that the message is used to request the switching of the LIPA bearer. The target HNB GW may determine, according to the foregoing information, that the source HNB requests the switching of the LIPA bearer. For example, the identifier of the local network is an LHN-ID; the identifier of the LGW is, for example, an LGW-ID; and the address of the LGW is, for example, an address LGW@LN, which is an address of the LGW in a local network domain, or an address LGW@CN, which is an address of the LGW in a core network domain. The address of the LGW may also be a control plane address or a user plane address between the LGW and the HNB, or the address of the LGW may also be a control plane address or a user plane address between the LGW and the source HNB GW.

The first relocation request message may further include explicit request information. For example, the first relocation request message includes the request information used for requesting the switching of the LIPA bearer. The target HNB GW may determine, according to the request information, that the source HNB requests the switching of the LIPA bearer, and then may further determine whether the target HNB supports the LIPA mobility.

In S120, the determining, by the target HNB GW, whether a target HNB supports LIPA mobility may include: determining whether the target HNB supports LIPA, and determining whether the target HNB can establish an LIPA connection with the LGW to which the source HNB connects. Therefore, the target HNB GW may perform the corresponding switching operation according to a result indicating whether the target HNB supports the LIPA mobility.

After receiving the first relocation request message, the target HNB GW may determine, according to information reported by the source HNB and/or the target HNB or information configured on a network management system, whether the target HNB supports the LIPA mobility. Optionally, in this embodiment of the present invention, the target HNB GW determines, according to whether the target HNB and the source HNB are located on a same local network, or according to whether the target HNB can establish an LIPA bearer with an LGW, whether the target HNB supports the LIPA mobility, where the LGW has established an LIPA bearer with the source HNB.

For example, the target HNB GW may determine, if the target HNB and the source HNB are located on a same local network, that the target HNB supports the LIPA mobility; and for another example, the target HNB GW may determine, if the target HNB and the source HNB are not located on a same local network, that the target HNB does not support the LIPA mobility. For another example, the target HNB GW may determine, if the target HNB can establish an LIPA bearer with an LGW, that the target HNB supports the LIPA mobility, where the LGW has established an LIPA bearer with the source HNB; and for another example, the target HNB GW may determine, if the target HNB cannot establish an LIPA bearer with an LGW, that the target HNB does not support the LIPA mobility, where the LGW has established an LIPA bearer with the source HNB.

For example, after receiving the first relocation request message, the target HNB GW may determine, by searching an HNB information table locally stored, an ID of a local network on which the target HNB resides and an ID of a local network on which the source HNB resides; and determine, by comparing whether the ID of the local network on which the target HNB resides and the ID of the local network on which the source HNB resides are the same, whether the target HNB supports the LIPA mobility. For another example, the target HNB GW may separately search, according to the HNB information table, an LGW that can establish an LIPA bearer with the target HNB and an LGW that can establish an LIPA bearer with the source HNB; and determine whether the corresponding LGWs are the same, so as to determine whether the target HNB supports the LIPA mobility.

Therefore, in the bearer switching method according to this embodiment of the present invention, a target HNB GW determines whether a target HNB supports LIPA mobility, and performs a corresponding switching operation, so that switching of an LIPA bearer is effectively managed, thereby saving a resource and signaling, and avoiding resource waste and an invalid signaling overhead caused when an HNB that does not support the LIPA mobility prepares the resource for the LIPA bearer.

Figure 3:
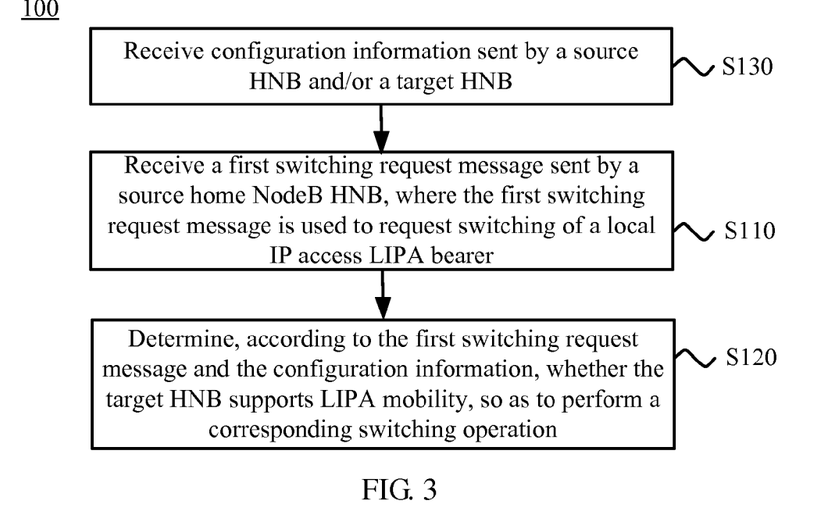
FIG. 3 is another schematic flowchart of a bearer switching method according to an embodiment of the present invention.

In this embodiment of the present invention, optionally, as shown in FIG. 3, the bearer switching method 100 may further include: S130. Receive configuration information sent by the source HNB and/or the target HNB. The configuration information includes information about LIPA support capability of the source HNB and/or the target HNB, and/or connection information of an LGW that connects to the source HNB or the target HNB. The connection information includes at least one of an identifier of a local network on which the LGW resides, an identifier of the LGW, and an address of the LGW.

Specifically, when a UE performs handover between HNBs and an HNB GW, the target HNB GW is also the source HNB GW. In this case, the target HNB GW may receive configuration information sent by the source HNB, where the configuration information includes information about LIPA support capability of the source HNB, and/or connection information of an LGW that connects to the source HNB; and the target HNB GW may also receive configuration information sent by the target HNB, where the configuration information includes information about LIPA support capability of the target HNB, and/or connection information of an LGW that connects to the target HNB. When the UE performs handover between HNBs and different HNB GWs, the target HNB GW receives configuration information sent by the target HNB, where the configuration information includes information about LIPA support capability of the target HNB, and/or connection information of a connected LGW. It should be understood that the LIPA support capability refers to a capability of the HNB to perform, by using the LGW, local IP access or service unloading. The address of the LGW may be an address of the LGW in a local network domain, or an address of the LGW in a core network domain. In addition, the address of the LGW may be a control plane address, or a user plane address.

Therefore, the target HNB GW may determine, according to the configuration information sent by the source HNB and/or the target HNB, whether the target HNB supports the LIPA mobility, so as to perform the corresponding switching operation. For example, in this embodiment of the present invention, when the target HNB GW determines that the target HNB supports the LIPA mobility, the target HNB GW sends the first relocation request sent by the source HNB to the target HNB, so that the target HNB may switch the LIPA bearer according to a current LIPA bearer switching process. When the target HNB GW determines that the target HNB does not support the LIPA mobility, the target HNB GW may reject the relocation request, or may delete related information about the LIPA bearer included in the relocation request and continue with switching of a non-LIPA bearer. The following describes the foregoing two cases with reference to FIG. 4 and FIG. 5, respectively.

Figure 4:
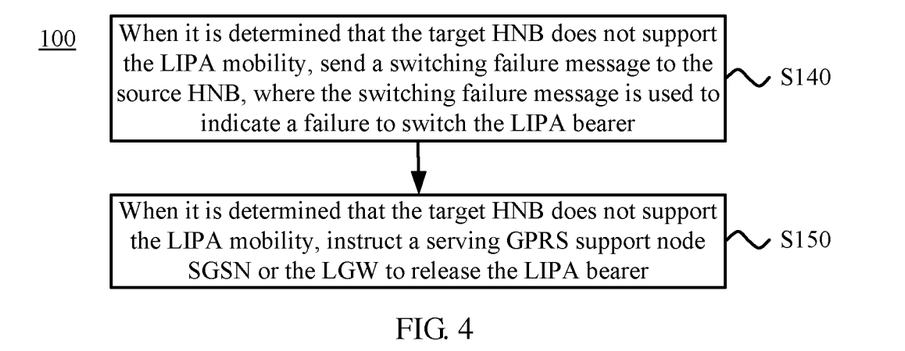
FIG. 4 is still another schematic flowchart of a bearer switching method according to an embodiment of the present invention.

As shown in FIG. 4, optionally, the bearer switching method 100 according to this embodiment of the present invention may further include: S140. When determining that the target HNB does not support the LIPA mobility, the target HNB GW sends a switching failure message to the source HNB, where the switching failure message is used to indicate a failure to switch the LIPA bearer.

Optionally, the switching failure message includes indication information, where the indication information is used to indicate that the target HNB does not support the LIPA mobility.

In this embodiment of the present invention, after the source HNB receives the switching failure message, the source HNB may instruct an SGSN or an LGW connected to the source HNB to initiate deactivation of the LIPA bearer; and the source HNB GW may also instruct the SGSN or the LGW to release or deactivate the LIPA bearer.

Therefore, as shown in FIG. 4, the method 100 may further include: S150. When determining that the target HNB does not support the LIPA mobility, the target HNB GW instructs the serving GPRS support node SGSN or the LGW to release the LIPA bearer.

Figure 5:
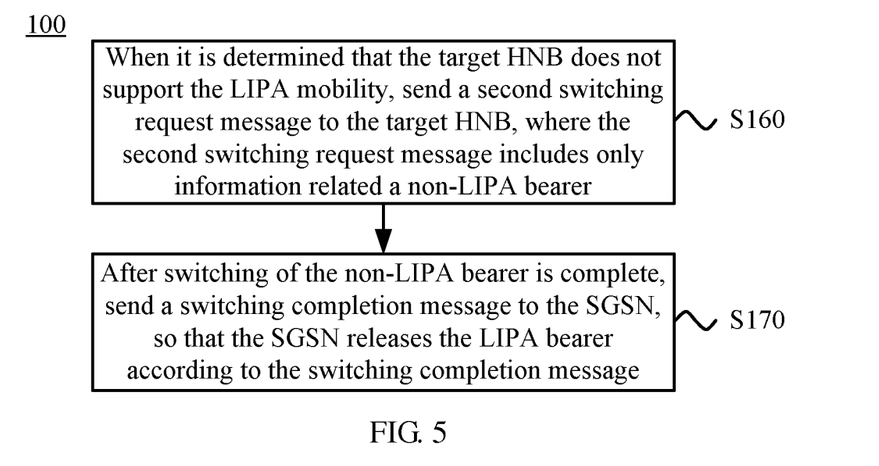
FIG. 5 is still another schematic flowchart of a bearer switching method according to an embodiment of the present invention.

In this embodiment of the present invention, when the target HNB GW determines that the target HNB does not support the LIPA mobility, the target HNB GW may also delete the related information about the LIPA bearer included in the relocation request, and continue with the switching of the non-LIPA bearer. As shown in FIG. 5, the method 100 according to this embodiment of the present invention may further include: S160. When determining that the target HNB does not support the LIPA mobility, the target HNB GW sends a second relocation request message to the target HNB, where the second relocation request message includes only information related to the non-LIPA bearer.

As shown in FIG. 5, the method 100 according to this embodiment of the present invention may further include: S170. After the switching of the non-LIPA bearer is complete, the target HNB GW sends a switching completion message to the serving GPRS support node SGSN, so that the SGSN releases the LIPA bearer according to the switching completion message.

In S160, the target HNB GW may delete the related information about the LIPA bearer in the first relocation request message received from the source HNB, so that only the information related to the non-LIPA bearer is included, and sends a second relocation request message to the target HNB, where the second relocation request message includes only the information related to the non-LIPA bearer and does not include the information related to the LIPA bearer in the first relocation request message, so that only the non-LIPA bearer is switched.

In S170, after the switching of the non-LIPA bearer is complete, the target HNB GW may instruct the SGSN to release or deactivate an LIPA bearer on a core domain side, for example, indicate that the bearer is successfully switched after a switching completion message is sent to the SGSN, so that the SGSN releases, after the switching completion message is received, an LIPA bearer that fails to be switched. For example, the target HNB GW sends a radio access bearer (Radio Access Bearer, "RAB" for short) release request (Release Request) message, which indicates that the LIPA bearer needs to be released; and the SGNS releases the LIPA bearer after receiving the message. It should be understood that the target HNB GW may also use another newly defined message to carry information such as LIPA bearer release indication, which indicates that the LIPA bearer that fails to be switched needs to be released.

Therefore, in the bearer switching method according to this embodiment of the present invention, a target HNB GW determines whether a target HNB supports LIPA mobility, and performs a corresponding switching operation, so that switching of an LIPA bearer is effectively managed, thereby saving a resource and signaling, and avoiding resource waste and an invalid signaling overhead caused when an HNB that does not support the LIPA mobility prepares the resource for the LIPA bearer.

In this embodiment of the present invention, the switching of the LIPA bearer includes intra-HNB GW switching and inter-HNB GW switching. The intra-HNB GW switching refers to handover of a UE between HNBs and an HNB GW.

When there is a direct interface Iurh between a source HNB and a target HNB, a switching message sent by the source HNB passes only the source HNB, the HNB GW, and the target HNB. The inter-HNB GW switching refers to handover of a UE between HNBs and different HNB GWs. This type of switching requires participation of a core domain, and a path of a switching message sent by the source HNB passes the source HNB, a source HNB GW, the CN domain, a target HWB GW, and the target HNB.

The following describes in detail the bearer switching method according to this embodiment of the present invention in the foregoing two cases with reference to FIG. 6A to FIG. 6D.

Figure 6A:
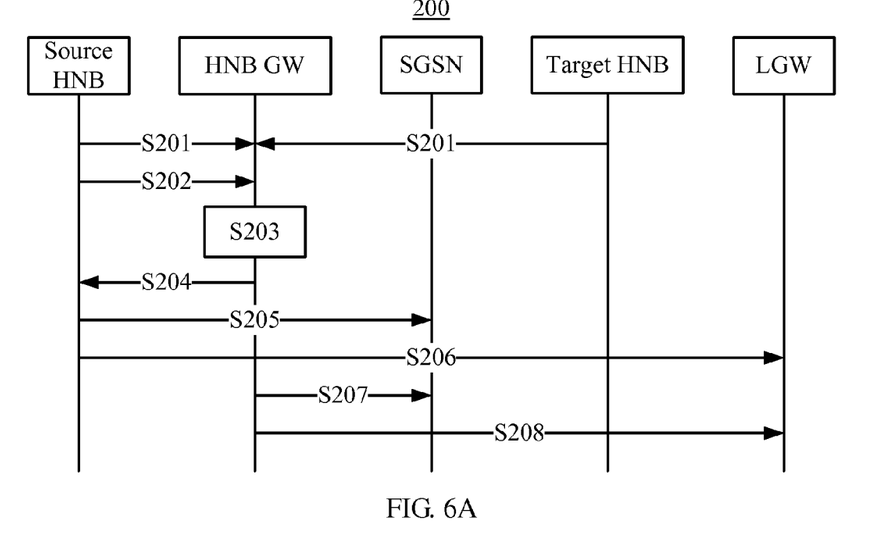
FIG. 6A to FIG. 6D are schematic flowcharts of a bearer switching method according to another embodiment of the present invention.

As shown in FIG. 6A, a bearer switching method 200 according to an embodiment of the present invention may be described as follows.

S201. An HNB GW receives configuration information sent by a source HNB and/or a target HNB.

For example, the configuration information may include information about LIPA support capability of the source HNB and/or the target HNB, and/or connection information of a connected LGW. The connection information includes at least one of an identifier of a local network on which the LGW resides, an identifier of the LGW, and an address of the LGW.

S202. The source HNB sends a first relocation request message to the HNB GW, where the first relocation request message is used to request switching of an LIPA bearer.

Optionally, the first relocation request message includes at least one of an identifier of a local network on which a local gateway LGW connecting to the source HNB resides, an identifier of the LGW, an address of the LGW, and request information used for requesting the switching of the LIPA bearer.

S203. The HNB GW determines, according to the first relocation request message, whether the target HNB supports LIPA mobility.

S204. When determining that the target HNB does not support the LIPA mobility, the HNB GW sends a switching failure message to the source HNB, where the switching failure message is used to indicate a failure to switch the LIPA bearer.

Optionally, the switching failure message includes indication information, where the indication information is used to indicate that the target HNB does not support the LIPA mobility.

When the HNB GW determines that the target HNB does not support the LIPA mobility, the source HNB or the HNB GW may instruct an SGSN or the LGW to initiate an operation of deactivating the LIPA bearer, for example, as described in S205 to S208 in FIG. 6A.

S205. The source HNB may instruct the SGSN to release the LIPA bearer.

S206. The source HNB may also instruct the LGW to release the LIPA bearer.

S207. The HNB GW may instruct the SGSN to release the LIPA bearer.

S208. The HNB GW may also instruct the LGW to release the LIPA bearer.

Figure 6B:
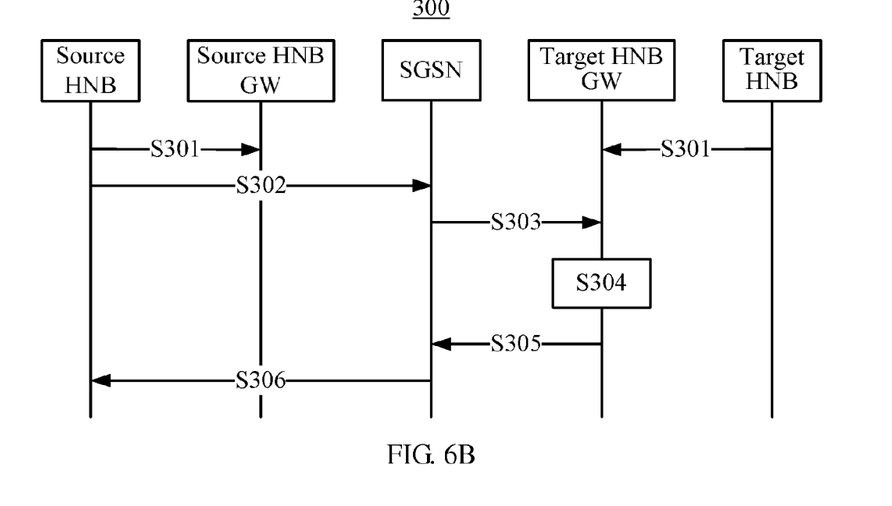

As shown in FIG. 6B, a bearer switching method 300 according to an embodiment of the present invention may be described as follows:

S301. A source HNB GW receives configuration information sent by a source HNB, and a target HNB GW receives configuration information sent by a target HNB.

For example, the configuration information received by the source HNB GW may include LIPA support capability information of the source HNB and/or connection information of a connected LGW; and the configuration information received by the target HNB GW may include LIPA support capability information of the target HNB and/or connection information of a connected LGW.

S302. The source HNB sends a first relocation request message to an SGSN, where the first relocation request message is used to request switching of an LIPA bearer.

For example, the first relocation request message may carry at least one of LIPA bearer indication, an LHN ID, and an address of the LGW. These information may be sent by the SGSN, and may also be sent by the source HNB.

S303. The SGSN sends the first relocation request message to the target HNB GW.

S304. The target HNB GW determines, according to the first relocation request message, whether the target HNB supports LIPA mobility.

S305. When determining that the target HNB does not support the LIPA mobility, the target HNB GW sends a switching failure message to the SGSN, where the switching failure message is used to indicate a failure to switch the LIPA bearer.

For example, the target HNB GW sends a relocation preparation failure (RELOCATION PREPARATION FAILURE) message to the SGSN.

S306. The SGSN sends the switching failure message to the source HNB.

Optionally, the switching failure message includes indication information, where the indication information is used to indicate that the target HNB does not support the LIPA mobility. After the source HNB receives the switching failure message, the source HNB may instruct the SGSN or the LGW to initiate an operation of deactivating the LIPA bearer.

Figure 6C:
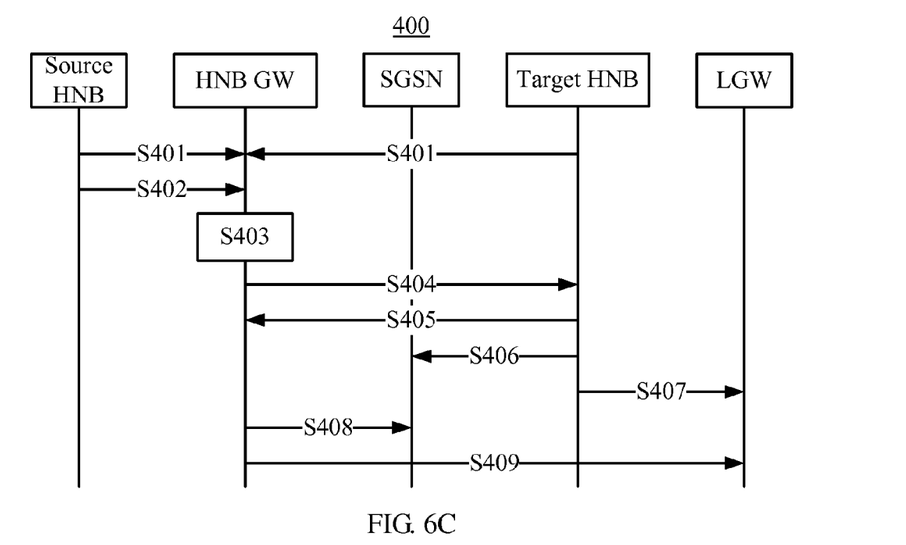

As shown in FIG. 6C, a bearer switching method 400 according to an embodiment of the present invention may be described as follows:

S401. An HNB GW receives configuration information sent by a source HNB and/or a target HNB.

S402. The source HNB sends a first relocation request message to the HNB GW, where the first relocation request message is used to request switching of an LIPA bearer.

S403. The HNB GW determines, according to the first relocation request message, whether the target HNB supports LIPA mobility.

S404. When determining that the target HNB does not support the LIPA mobility, the HNB GW sends a second relocation request message to the target HNB, where the second relocation request message does not include information related to the LIPA bearer in the first relocation request message.

For example, HNB GW changes Radio Access Network Application Part (Radio Access Network Application Part, "RANAP" for short) of the first relocation request message received from the source HNB, and specifically, deletes the information related to the LIPA bearer from an RABs To Be Setup List IE (information element of a list of radio access bearers to be set up) and/or from a Source To Target Container (source to target container), where the RABs To Be Setup List IE and the Source To Target Container are in an RANAP: ENHANCED RELOCATION INFORMATION REQUEST (enhanced relocation information request), so that the second relocation request message sent by the target HNB includes only information related to a non-LIPA bearer.

S405. After switching of the non-LIPA bearer is complete, the target HNB sends a switching completion message to the HNB GW.

After the HNB GW receives the switching completion message sent by the target HNB, similarly, the target HNB or the HNB GW may instruct an SGSN or an LGW to initiate an operation of deactivating the LIPA bearer.

Figure 6D:
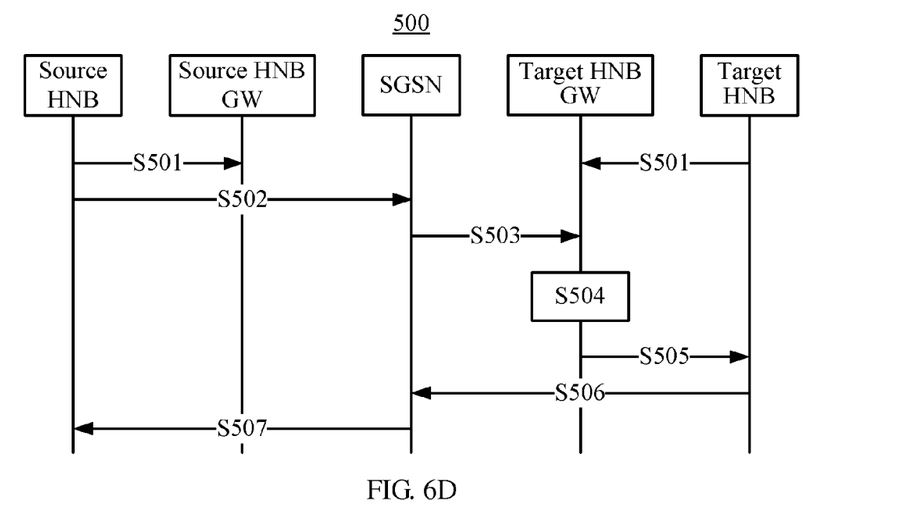

As shown in FIG. 6D, a bearer switching method 500 according to an embodiment of the present invention may be described as follows:

S501. A source/target HNB GW receives configuration information sent by a source/target HNB. The configuration information may include LIPA support capability information of the source/target HNB and/or connection information of a connected LGW.

S502. The source HNB sends a first relocation request message to an SGSN, where the first relocation request message is used to request switching of an LIPA bearer. The first relocation request message may carry at least one of LIPA bearer indication, an LHN ID, and an address of the LGW. These information may be sent by the SGSN, and may also be sent by the source HNB.

S503. The SGSN sends the first relocation request message to the target HNB GW.

S504. The target HNB GW determines, according to the first relocation request message, whether the target HNB supports LIPA mobility.

S505. When determining that the target HNB does not support the LIPA mobility, the target HNB GW sends a second relocation request message to the target HNB, where the second relocation request message does not include information related to the LIPA bearer in the first relocation request message.

For example, the target HNB GW changes the information related to the LIPA bearer in a source-to-target container (Source To Target Container) in an RANAP message, so that the container contains only a non-LIPA bearer; or the target HNB GW deletes the information related to the LIPA bearer from an information element of a list of radio access bearers to be set up (RABs To Be Setup Item IEs); or the target HNB GW deletes the information related to the LIPA bearer from both the Source To Target Container and the RABs To Be Setup Item IEs.

S506. The target HNB sends a relocation request acknowledgment message to the SGSN.

S507. The SGSN sends a switching command to the source HNB.

After the switching of the non-LIPA bearer is complete, similarly, the target HNB or the target HNB GW may instruct the SGSN or the LGW to initiate an operation of deactivating the LIPA bearer.

It should be understood that in various embodiments of the present invention, the sequence numbers of the foregoing processes do not mean priorities of execution sequences. The execution sequences of the processes should be determined according to functions and internal logic of the processes, and should not be construed as any limitation on the implementation processes according to the embodiments of the present invention.

Therefore, in the bearer switching method according to this embodiment of the present invention, a target HNB GW determines whether a target HNB supports LIPA mobility, and performs a corresponding switching operation, so that switching of an LIPA bearer is effectively managed, thereby saving a resource and signaling, and avoiding resource waste and an invalid signaling overhead caused when an HNB that does not support the LIPA mobility prepares the resource for the LIPA bearer.

The foregoing has described in detail a bearer switching method according to an embodiment of the present invention from an angle of an HNB GW with reference to FIG. 2 to FIG. 6D. The following describes a bearer switching method according to an embodiment of the present invention from an angle of an HNB with reference to FIG. 7 and FIG. 8.

Figure 7:
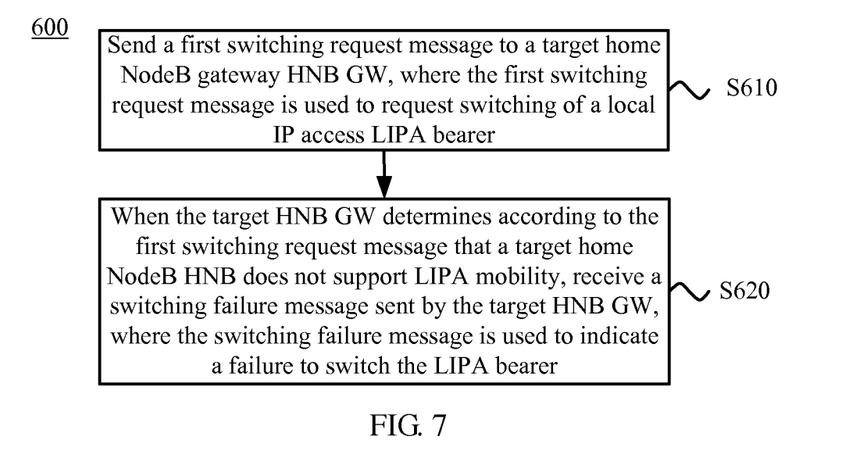
FIG. 7 is a schematic flowchart of a bearer switching method according to still another embodiment of the present invention.

As shown in FIG. 7, a bearer switching method 600 according to an embodiment of the present invention may be described as follows:

S610. A source HNB sends a first relocation request message to a target home NodeB gateway HNB GW, where the first relocation request message is used to request switching of a local IP access LIPA bearer.

S620. When the target HNB GW determines according to the first relocation request message that a target home NodeB HNB does not support LIPA mobility, the source HNB receives a switching failure message sent by the target HNB GW, where the switching failure message is used to indicate a failure to switch the LIPA bearer.

Therefore, in the bearer switching method according to this embodiment of the present invention, a target HNB GW determines whether a target HNB supports LIPA mobility, and performs a corresponding switching operation, so that switching of an LIPA bearer is effectively managed, thereby saving a resource and signaling, and avoiding resource waste and an invalid signaling overhead caused when an HNB that does not support the LIPA mobility prepares the resource for the LIPA bearer.

In this embodiment of the present invention, optionally, the first relocation request message includes at least one of an identifier of a local network on which a local gateway LGW connecting to the source HNB resides, an identifier of the LGW, an address of the LGW, and request information used for requesting the switching of the LIPA bearer. Optionally, the switching failure message includes indication information, where the indication information is used to indicate that the target HNB does not support the LIPA mobility.

Figure 8:
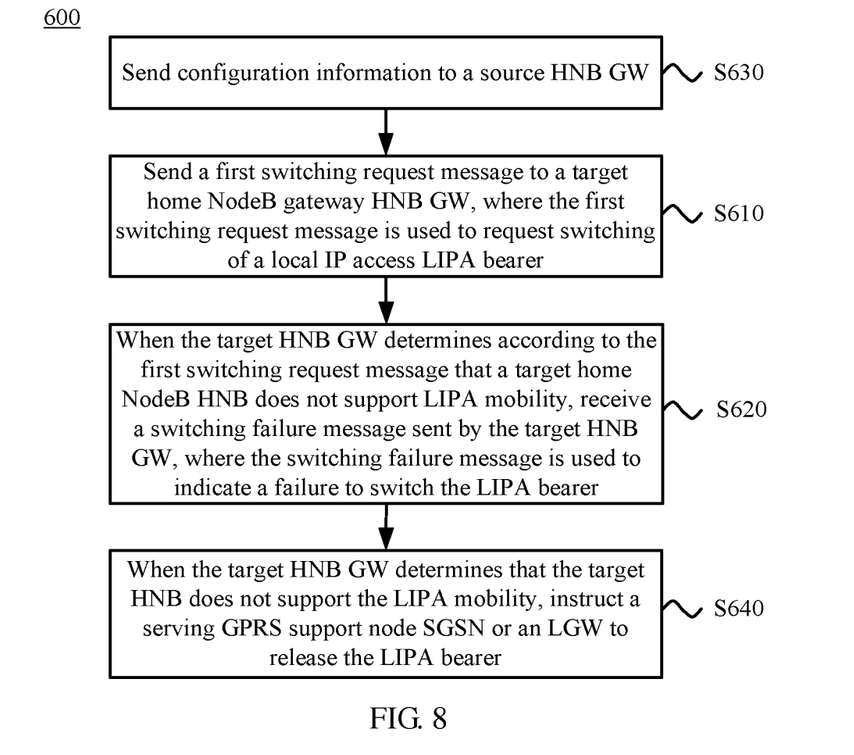
FIG. 8 is another schematic flowchart of a bearer switching method according to still another embodiment of the present invention.

As shown in FIG. 8, optionally, the bearer switching method 600 according to an embodiment of the present invention may further include the following content:

S630. The source HNB sends configuration information to a source HNB GW, where the configuration information includes LIPA support capability information of the source HNB and/or connection information of the connected local gateway LGW, and the connection information includes at least one of the identifier of the local network on which the LGW resides, the identifier of the LGW, and the address of the LGW.

Optionally, the method 600 may further include: S640. When the target HNB GW determines that the target HNB does not support the LIPA mobility, the source HNB instructs a serving GPRS support node SGSN or the LGW to release the LIPA bearer.

Therefore, in the bearer switching method according to this embodiment of the present invention, a target HNB GW determines whether a target HNB supports LIPA mobility, and performs a corresponding switching operation, so that switching of an LIPA bearer is effectively managed, thereby saving a resource and signaling, and avoiding resource waste and an invalid signaling overhead caused when an HNB that does not support the LIPA mobility prepares the resource for the LIPA bearer.

The foregoing has described in detail a bearer switching method according to an embodiment of the present invention with reference to FIG. 1A to FIG. 8. The following describes in detail a home NodeB gateway HNB GW and a home NodeB HNB according to embodiments of the present invention with reference to FIG. 9 to FIG. 14.

Figure 9:
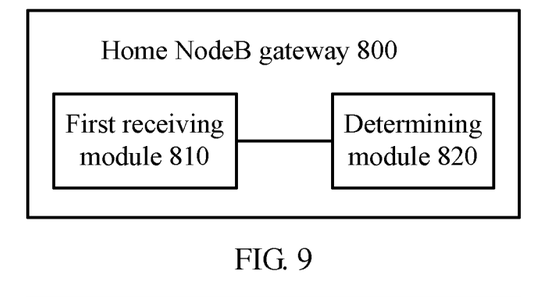
FIG. 9 is a schematic block diagram of a home NodeB gateway according to an embodiment of the present invention.

FIG. 9 shows a schematic block diagram of a home NodeB gateway HNB GW 800 according to an embodiment of the present invention. As shown in FIG. 9, the home NodeB gateway HNB GW 800 includes: a first receiving module 810 and a determining module 820.

The first receiving module 810 is configured to receive a first relocation request message sent by a source home NodeB HNB, where the first relocation request message is used to request switching of a local IP access LIPA bearer.

The determining module 820 is configured to determine, according to the first relocation request message received by the first receiving module 810, whether a target HNB supports LIPA mobility, so as to perform a corresponding switching operation.

Therefore, for the home NodeB gateway according to this embodiment of the present invention, a target HNB GW determines whether a target HNB supports LIPA mobility, and performs a corresponding switching operation, so that switching of an LIPA bearer is effectively managed, thereby saving a resource and signaling, and avoiding resource waste and an invalid signaling overhead caused when an HNB that does not support the LIPA mobility prepares the resource for the LIPA bearer.

In this embodiment of the present invention, optionally, the first relocation request message received by the first receiving module 810 includes at least one of an identifier of a local network on which a local gateway LGW connecting to the source HNB resides, an identifier of the LGW, an address of the LGW, and request information used for requesting the switching of the LIPA bearer.

Figure 10:
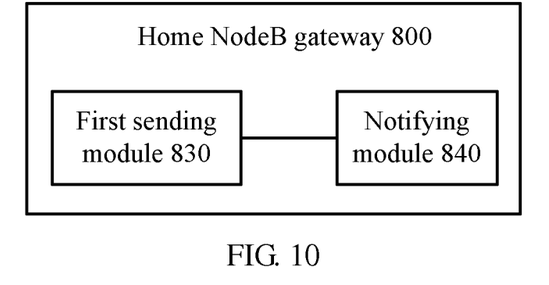
FIG. 10 is another schematic block diagram of a home NodeB gateway according to an embodiment of the present invention.

In this embodiment of the present invention, optionally, as shown in FIG. 10, the HNB GW 800 further includes: a first sending module 830, configured to, when the determining module 820 determines that the target HNB does not support the LIPA mobility, send a switching failure message to the source HNB, where the switching failure message is used to indicate a failure to switch the LIPA bearer.

Optionally, the switching failure message sent by the first sending module 830 includes indication information, where the indication information is used to indicate that the target HNB does not support the LIPA mobility.

In this embodiment of the present invention, optionally, as shown in FIG. 10, the HNB GW 800 further includes: a notifying module 840, configured to, when the determining module 820 determines that the target HNB does not support the LIPA mobility, instruct a serving GPRS support node SGSN or the LGW to release the LIPA bearer.

Figure 11:
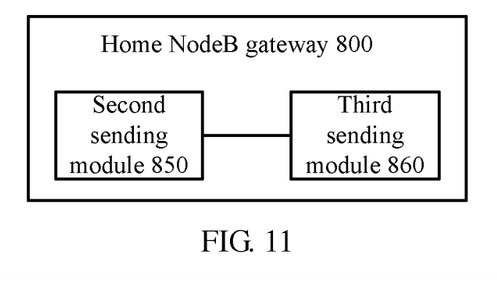
FIG. 11 is still another schematic block diagram of a home NodeB gateway according to an embodiment of the present invention.

In this embodiment of the present invention, optionally, as shown in FIG. 11, the HNB GW 800 further includes: a second sending module 850, configured to, when the determining module 820 determines that the target HNB does not support the LIPA mobility, send a second relocation request message to the target HNB, where the second relocation request message includes only information related to a non-LIPA bearer.

Optionally, as shown in FIG. 11, the HNB GW 800 further includes: a third sending module 860, configured to, after switching of the non-LIPA bearer is complete, send a switching completion message to the serving GPRS support node SGSN, so that the SGSN releases the LIPA bearer according to the switching completion message.

Figure 12:
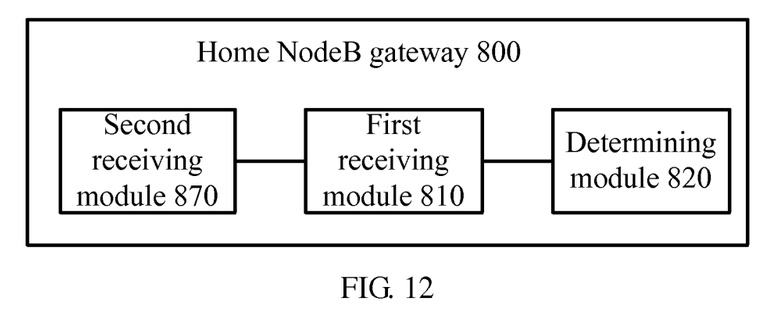
FIG. 12 is still another schematic block diagram of a home NodeB gateway according to an embodiment of the present invention.

In this embodiment of the present invention, optionally, as shown in FIG. 12, the HNB GW 800 further includes: a second receiving module 870, configured to receive configuration information sent by the source HNB and/or the target HNB, where the configuration information includes information about LIPA support capability of the source HNB and/or the target HNB, and/or connection information of a connected LGW, and the connection information includes at least one of an identifier of a local network on which the LGW resides, an identifier of the LGW, and an address of the LGW.

Optionally, the determining module 820 is further configured to determine, according to whether the target HNB and the source HNB are located on a same local network, or according to whether the target HNB can establish an LIPA bearer with an LGW, whether the target HNB supports the LIPA mobility, where the LGW has established an LIPA bearer with the source HNB.

It should be understood that the HNB GW 800 according to this embodiment of the present invention may correspond to the target home NodeB gateway HNB GW in a bearer switching method according to an embodiment of the present invention, and the foregoing and other operations and/or functions of various modules in the HNB GW 800 are performed to implement corresponding processes of the methods 100 to 600 shown in FIG. 2 to FIG. 8, respectively. For purpose of simplicity, no further details are provided herein.

Therefore, for the home NodeB gateway according to this embodiment of the present invention, a target HNB GW determines whether a target HNB supports LIPA mobility, and performs a corresponding switching operation, so that switching of an LIPA bearer is effectively managed, thereby saving a resource and signaling, and avoiding resource waste and an invalid signaling overhead caused when an HNB that does not support the LIPA mobility prepares the resource for the LIPA bearer.

Figure 13:
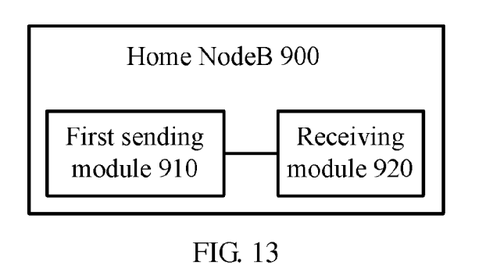
FIG. 13 is a schematic block diagram of a home NodeB according to an embodiment of the present invention.

FIG. 13 shows a schematic block diagram of an HNB 900 according to an embodiment of the present invention. As shown in FIG. 13, the HNB 900 includes: a first sending module 910 and a receiving module 920.

The first sending module 910 is configured to send a first relocation request message to a target home NodeB gateway HNB GW, where the first relocation request message is used to request switching of a local IP access LIPA bearer.

The receiving module 920 is configured to, when the target HNB GW determines according to the first relocation request sent by the first sending module 910 that a target home NodeB HNB does not support LIPA mobility, receive a switching failure message sent by the target HNB GW and used to indicate a failure to switch the LIPA bearer.

Therefore, with the home NodeB according to this embodiment of the present invention, a target HNB GW determines whether a target HNB supports LIPA mobility, and performs a corresponding switching operation, so that switching of an LIPA bearer is effectively managed, thereby saving a resource and signaling, and avoiding resource waste and an invalid signaling overhead caused when an HNB that does not support the LIPA mobility prepares the resource for the LIPA bearer.

In this embodiment of the present invention, optionally, the first relocation request message sent by the first sending module 910 includes at least one of an identifier of a local network on which a local gateway LGW connecting to the HNB resides, an identifier of the LGW, an address of the LGW, and request information used for requesting the switching of the LIPA bearer.

Optionally, the switching failure message received by the receiving module 920 includes indication information, where the indication information is used to indicate that the target HNB does not support the LIPA mobility.

Figure 14:
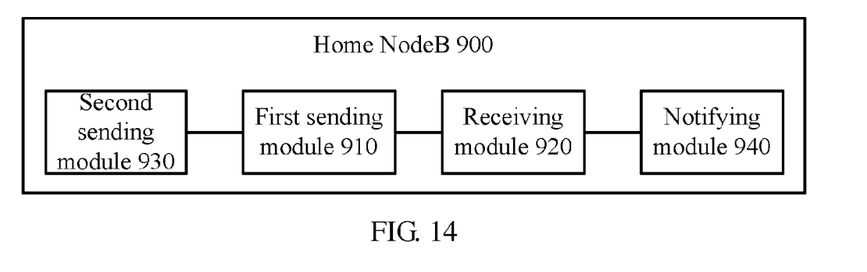
FIG. 14 is another schematic block diagram of a home NodeB according to an embodiment of the present invention.

Optionally, as shown in FIG. 14, the HNB 900 further includes: a second sending module 930, configured to send configuration information to a source HNB GW, where the configuration information includes LIPA support capability information of the HNB and/or connection information of the connected local gateway LGW, and the connection information includes at least one of the identifier of the local network on which the LGW resides, the identifier of the LGW, and the address of the LGW.

In this embodiment of the present invention, optionally, as shown in FIG. 14, the HNB 900 further includes: a notifying module 940, configured to, when the target HNB GW determines that the target HNB does not support the LIPA mobility, instruct a serving GPRS support node SGSN or the LGW to release the LIPA bearer.

It should be understood that the HNB 900 according to this embodiment of the present invention may correspond to the source home NodeB HNB in a bearer switching method according to an embodiment of the present invention, and the foregoing and other operations and/or functions of various modules in the HNB 900 are performed to implement corresponding processes of the methods 100 to 600 shown in FIG. 2 to FIG. 8, respectively. For purpose of simplicity, no further details are provided herein.

Therefore, with the home NodeB according to this embodiment of the present invention, a target HNB GW determines whether a target HNB supports LIPA mobility, and performs a corresponding switching operation, so that switching of an LIPA bearer is effectively managed, thereby saving a resource and signaling, and avoiding resource waste and an invalid signaling overhead caused when an HNB that does not support the LIPA mobility prepares the resource for the LIPA bearer.

A person of ordinary skill in the art may be aware that, in combination with the examples described in the embodiments disclosed in this specification, units and steps of the methods may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some or all of the units may be selected to achieve the objective of the solution of the embodiment of the present invention according to actual needs.

In addition, functional units in the embodiments of the present invention may be integrated into one processing unit, or each of the units may exist alone physically, or two or more units may be integrated into one unit. The integrated units may be implemented in a form of hardware, or may be implemented in a form of a software functional unit.

When the integrated units are implemented in a form of a software functional unit and sold or used as an independent product, the integrated units may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium and includes several instructions for instructing a computer device (which may be a personal computer, a server, or a network device) or a processor (processor) to perform all or a part of the steps of the methods described in the embodiments of the present invention. The foregoing storage medium includes: any mediums that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific embodiments of the present invention, but are not intended to limit the protection scope of the present invention. Any equivalent modification or replacement readily figured out by a person skilled in the art within the technical scope of the present invention shall fall within the protection scope of the present invention. Therefore, the protection scope of the present invention shall be subject to the protection scope of the claims.

What is claimed is:

1. A bearer switching method, comprising:
   receiving, by a target home NodeB (HNB) gateway (HNB"GW), a first relocation request message sent by a source HNB, wherein the first relocation request message is used to request switching of a local IP access (LIPA) bearer from a source HNB to a target HNB; and
   determining, by the target HNB GW and according to the first relocation request message, whether a target HNB supports LIPA mobility, so as to perform a corresponding switching operation.

2. The method according to claim 1, wherein the first relocation request message comprises at least one of an identifier of a local network on which a local gateway (LGW) connecting to the source HNB resides, an identifier of the LGW, an address of the LGW, and request information used for requesting the switching of the LIPA bearer.

3. The method according to claim 1, further comprising:
   sending a switching failure message to the source HNB when it is determined that the target HNB does not support the LIPA mobility, wherein the switching failure message is used to indicate a failure to switch the LIPA bearer.

4. The method according to claim 3, wherein the switching failure message comprises indication information, and the indication information is used to indicate that the target HNB does not support the LIPA mobility.

5. The method according to claim 3, further comprising:
when it is determined that the target HNB does not support the LIPA mobility, instructing a serving GPRS support node (SGSN) or the LGW to release the LIPA bearer.

6. The method according to claim 1, further comprising:
sending a second relocation request message to the target HNB when it is determined that the target HNB does not support the LIPA mobility, wherein the second relocation request message comprises only information related to a non-LIPA bearer.

7. The method according to claim 6, further comprising:
sending a switching completion message to a serving GPRS support node (SGSN) after switching of the non-LIPA bearer is complete, so that the SGSN releases the LIPA bearer according to the switching completion message.

8. The method according to claim 1, further comprising:
receiving configuration information sent by the source HNB and/or the target HNB, wherein the configuration information comprises information about LIPA support capability of the source HNB and/or the target HNB, and/or connection information of a connected LGW, and the connection information comprises at least one of an identifier of a local network on which the LGW resides, an identifier of the LGW, and an address of the LGW.

9. The method according to claim 1, wherein the determining whether a target HNB supports LIPA mobility comprises:
determining, according to whether the target HNB and the source HNB are located on a same local network, or according to whether the target HNB can establish an LIPA bearer with an LGW, whether the target HNB supports the LIPA mobility, wherein the LGW has established an LIPA bearer with the source HNB.

10. A bearer switching method, comprising:
sending, by a source home NodeB (HNB), a first relocation request message to a target HNB gateway (HNB GW), wherein the first relocation request message is used to request switching of a local IP access (LIPA) bearer from a source HNB to a target HNB; and
when the target HNB GW determines according to the first relocation request message that the target HNB does not support LIPA mobility, receiving a switching failure message sent by the target HNB GW, wherein the switching failure message is used to indicate a failure to switch the LIPA bearer.

11. The method according to claim 10, wherein the first relocation request message comprises at least one of an identifier of a local network on which a local gateway (LGW) connecting to the source HNB resides, an identifier of the LGW, an address of the LGW, and request information used for requesting the switching of the LIPA bearer.

12. The method according to claim 10, wherein the switching failure message comprises indication information, and the indication information is used to indicate that the target HNB does not support the LIPA mobility.

13. The method according to claim 10, further comprising:
sending configuration information to a source HNB GW, wherein the LIPA configuration information comprises LIPA support capability information of the source HNB and/or connection information of the connected local gateway (LGW), and the connection information comprises at least one of the identifier of the local network on which the LGW resides, the identifier of the LGW, and the address of the LGW.

14. The method according to claim 10, further comprising:
when the target HNB GW determines that the target HNB does not support the LIPA mobility, instructing a serving GPRS support node (SGSN) or the LGW to release the LIPA bearer.

15. A home NodeB gateway (HNB GW), comprising:
a receiver, configured to receive a first relocation request message sent by a source home NodeB (HNB), wherein the first relocation request message is used to request switching of a local IP access (LIPA) bearer from a source HNB to a target HNB; and
a processor, configured to determine, according to the first relocation request message, whether the target HNB supports LIPA mobility, so as to perform a corresponding switching operation.

16. The HNB GW according to claim 15, wherein the first relocation request message comprises at least one of an identifier of a local network on which a local gateway (LGW) connecting to the source HNB resides, an identifier of the LGW, an address of the LGW, and request information used for requesting the switching of the LIPA bearer.

17. The HNB GW according to claim 15, further comprising:
a transmitter, configured to, when the processor determines that the target HNB does not support the LIPA mobility, send a switching failure message to the source HNB, wherein the switching failure message is used to indicate a failure to switch the LIPA bearer.

18. The HNB GW according to claim 17, wherein the switching failure message comprises indication information, and the indication information is used to indicate that the target HNB does not support the LIPA mobility.

19. The HNB GW according to claim 17, wherein the transmitter is further configured to, when the processor determines that the target HNB does not support the LIPA mobility, instruct a serving GPRS support node (SGSN) or the LGW to release the LIPA bearer.

20. The HNB GW according to claim 15, further comprising:
a transmitter, configured to, when the processor determines that the target HNB does not support the LIPA mobility, send a second relocation request message to the target HNB, wherein the second relocation request message comprises only information related to a non-LIPA bearer.

21. The HNB GW according to claim 20, wherein the transmitter is further configured to, after switching of the non-LIPA bearer is complete, send a switching completion message to a serving GPRS support node (SGSN), so that the SGSN releases the LIPA bearer according to the switching completion message.

22. The HNB GW according to claim 15, wherein the receiver is further configured to receive configuration information sent by the source HNB and/or the target HNB, wherein the configuration information comprises information about LIPA support capability of the source HNB and/or the target HNB, and/or connection information of a connected LGW, and the connection information comprises at least one of an identifier of a local network on which the LGW resides, an identifier of the LGW, and an address of the LGW.

23. The HNB GW according to claim 15, wherein the processor is further configured to determine, according to whether the target HNB and the source HNB are located on a same local network, or according to whether the target HNB can establish an LIPA bearer with an LGW, whether the target HNB supports the LIPA mobility, wherein the LGW has established an LIPA bearer with the source HNB.

24. A home NodeB (HNB), comprising:
a transmitter, configured to send a first relocation request message to a target home NodeB gateway (HNB GW), wherein the first relocation request message is used to request switching of a local IP access LIPA bearer from a source HNB to a target HNB; and
a receiver, configured to, when the target HNB GW determines according to the first relocation request message that the target HNB does not support LIPA mobility, receive a switching failure message sent by the target HNB GW, wherein the switching failure message is used to indicate a failure to switch the LIPA bearer.

25. The HNB according to claim 24, wherein the first relocation request message comprises at least one of an identifier of a local network on which a local gateway (LGW) connecting to the source HNB resides, an identifier of the LGW, an address of the LGW and request information used for requesting the switching of the LIPA bearer.

26. The HNB according to claim 24, wherein the switching failure message comprises indication information, and the indication information is used to indicate that the target HNB does not support the LIPA mobility.

27. The HNB according to claim 24, wherein the transmitter is further configured to send configuration information to a source HNB GW, wherein the LIPA configuration information comprises LIPA support capability information of the source HNB and/or connection information of the connected local gateway (LGW), and the connection information comprises at least one of the identifier of the local network on which the LGW resides, the identifier of the LGW, and the address of the LGW.

28. The HNB according to claim 24, wherein the transmitter is further configured to, when the target HNB GW determines that the target HNB does not support the LIPA mobility, instruct a serving GPRS support node (SGSN) or the LGW to release the LIPA bearer.

* * * * *